Dec. 12, 1961 A. J. WILLIAMS 3,012,576
CONTROL VALVES WITH SPOOL CHECK AND SPOOL
ALIGNMENT DEVICES
Filed Dec. 24, 1959 3 Sheets-Sheet 1

Fig.I.

INVENTOR:
Arthur J. Williams

BY
*Hooper, Leonard & Buell*

ATTORNEYS

Dec. 12, 1961     A. J. WILLIAMS     3,012,576
CONTROL VALVES WITH SPOOL CHECK AND SPOOL
ALIGNMENT DEVICES
Filed Dec. 24, 1959     3 Sheets-Sheet 2

INVENTOR.
Arthur J. Williams

ATTORNEYS

United States Patent Office 3,012,576
Patented Dec. 12, 1961

3,012,576
CONTROL VALVES WITH SPOOL CHECK AND SPOOL ALIGNMENT DEVICES
Arthur J. Williams, Hubbard, Ohio, assignor to The Commercial Shearing and Stamping Company, a corporation of Ohio
Filed Feb. 24, 1959, Ser. No. 795,248
7 Claims. (Cl. 137—622)

This invention relates to control valves and particularly to new and novel control valve structures for use in fluid pressure systems.

In control valves, it is desirable that valve closure clearances be very close to prevent leakage, for example clearances on the order of .0002 inch, between the engaging portions of the bore and the spool which controls the flow of fluid pressure are common. Thus, bore lands must be near perfect in alignment, as well as spool lands, since the slightest deviation in alignment may cause the spool to bind in the bore or even refuse to engage the bore lands. Grinding and honing the bore in a valve body to near perfect alignment with such an extremely small tolerance is an exceedingly slow, difficult and expensive operation, particularly in spool type valves, which require longer bores. Moreover, even when bores have been painstakingly ground to perfect alignment, deviations in alignment sufficient to bind the spool in the bore may be introduced in other ways, for example, a slight distorting of the body casting when fluid pressure is released therein or a slight deviation in the spool lands may be sufficient to bind the spool in the bore may be introduced in other ways, for example, a slight distortion of the body casting when fluid pressure is released therein or a slight deviation in the spool lands may be sufficient to cause the spool to bind.

My new and novel construction obviates this problem by providing novel sleeves in the bore which eliminates all or most of the grinding and honing operation of the bore in the valve body casting, and minimizes the effects of various alignment deviations.

Preferably in my invention the sleeves are honed on their internal diameter to the microscopic clearance required in combination with the spool to prevent the fluid from leaking therethrough. However, between the outside diameter of the sleeve and the bore in the body of the valve, a generous clearance, on the order of .010 inch for example, is allowed. Thus the bore openings need not be so near perfectly aligned since the greater clearance between the sleeves and the bore allows the sleeves to compensate by shifting accordingly. Deviations in bore alignment caused by any distorting of the valve body casting when subjected to pressure is similarly compensated for. Likewise, deviations in the spool or even a combination of bore and spool alignment deviations will be compensated for by the ability of my sleeves to shift in any direction with respect to the bore axis to thus preserve the required alignment. Leakage of fluid between the sleeve and the bore is prevented by use of O-type packing rings disposed therein. Those skilled in the art can readily understand the great savings in trouble, time and expense involved in the grinding and honing to near perfect alignment the various bore lands in the long bore of a spool type valve required in other control valves as compared to grinding and honing of the internal diameter of my sleeves, which is a relatively simple and inexpensive operation. Furthermore, valve operation is greatly improved in that the likelihood of spool binding is greatly reduced. This results in even greater savings by minimizing expensive shutdowns and repairs.

It is also desirable to provide check valves in control valve structures to prevent fluid from leaking back from the motor ports during pressure failures. Heretofore, this has been done in different ways such as by providing separate check valves in the fluid lines apart from the control valve or by relatively complicated arrangements directing fluid flow through channels within the spool with checking means located therein. My novel construction provides a unique arrangement whereby certain of the sleeves disposed in the bore act as check valves. As a result, my check valves are located entirely outside of the spool and surround the spool where they act both as check valves and as sleeves for those portions of the spool so surrounded. My sleeve type check valves have the additional advantage of allowing a greater, less restricted flow of fluid when in operation; they are more accessible for cleaning and repairing; and they are less likely to become blocked or clogged. Here, too, those skilled in the art will readily comprehend the savings involved in fabricating my relatively simple but unique structure compared to the complicated structures heretofore utilized. Thus, my unique check valve sleeve gives better performance at lower manufacturing cost.

In a preferred form of my invention, I provide a control valve comprising a valve body having a cylindrical bore, port means in said valve body adapted to connect said bore with a source of fluid pressure, with exhaust means and with pressure actuated devices, sleeve members within said bore, a valve spool element slidably disposed within said sleeve members and adapted to cooperate with said sleeve members to control communication of said source of fluid pressure, said pressure actuated devices and said exhaust means, said sleeve members having a substantially greater outside diameter clearance with said bore than inside diameter clearance with said spool element, with certain of said sleeve members operable to slide within said bore as check valves.

Other details, objects and advantages of the invention will become apparent as the following description of a present preferred embodiment thereof proceeds.

In the accompanying drawings, I have shown a present preferred embodiment of the invention in which FIGURE 1 is a section through a single valve control, according to my invention in the neutral position;

Figure 1:
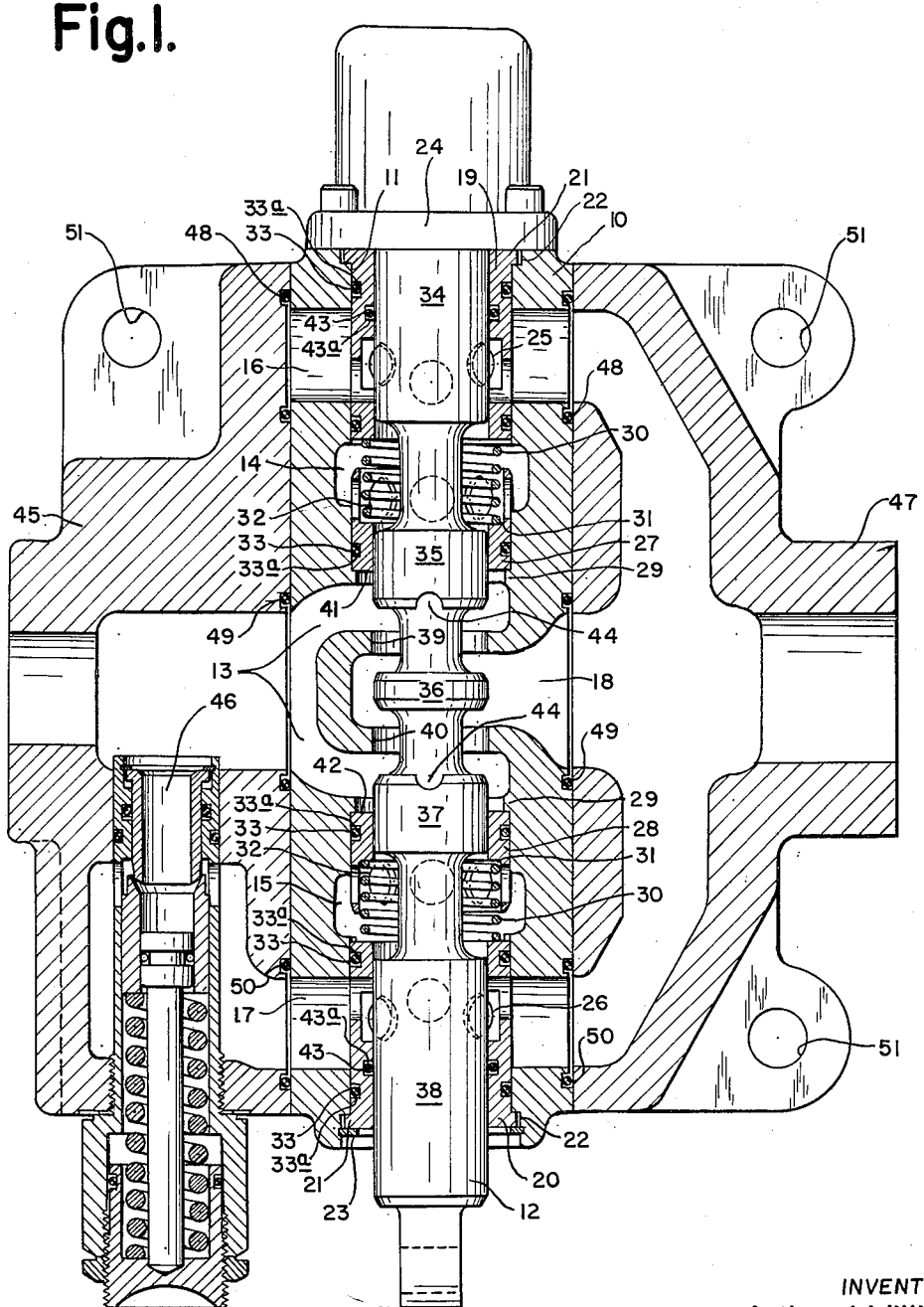

Referring now to the drawings, I provide a valve body 10 with side-by-side bores 11 therethrough and a spool element 12 disposed in each of said bores 11. Fluid pressure port 13 in body 10 connects bores 11 with a source of fluid pressure, motor ports 14 and 15 in body 10 connect bores 11 with the pressure actuated devices to be controlled, motor exhaust ports 16 and 17 and valve exhaust port 18 in body 10 connect bores 11 with the exhaust means. In a present preferred embodiment, sleeves 19 and 20 are disposed within bores 11 and in engagement therewith. Sleeves 19 and 20 are positioned therein by flanged portions 21 on the ends of said sleeves seating in well sections 22 in the ends of bores 11 and are retained therein by retaining ring 23 at one end of bores 11 and cap plate 24 at the other end of bores 11. Sleeves 19 and 20 have a series of spaced openings 25 and 26, respectively, through their walls adjacent to their respective motor exhaust ports 16 and 17, connecting bores 11 therewith.

Check sleeves 27 and 28 are disposed within bores 11 in slidable engagement therewith. Sleeves 27 and 28 are positioned and retained therein by means of annular flanges 29 of valve body 10 at one end of sleeves 27 and 28 and at the other end by means of springs 30, which are seated in well section 31 of sleeves 27 and 28 and bear on the inner end of said sleeves to resiliently urge said sleeves against flanges 29. Check sleeves 27 and 28 are provided with spaced openings 32 through their walls adjacent their respective motor ports 14 and 15 connecting bores 11 therewith.

The outside diameter of sleeves 19, 20, 27 and 28 are such that the clearance between the diameter of bores 11 and the outside diameter of said sleeves is on the order of .010 inch. O-type rings 33 are disposed in grooves 33a provided for their reception about the outside diameter of sleeves 19, 20, 27 and 28 to assure fluid-tight engagement between said sleeves and bores 11.

Each spool element 12 contains a number of annular ridges or lands 34, 35, 36, 37 and 38 spaced along its length which slidably engage the inside diameter of sleeves 19, 20, 27 and 28 as well as annular land portions 39 and 40 of bores 11 in the presently described embodiment. The clearance between the ridges or lands of said spool and the inside diameter of said sleeves and bore lands 39 and 40 are sufficiently close during engagement, e.g., on the order of .0002", to substantially prevent the leakage of fluid under pressure therethrough.

Referring now to FIGURE 1, spool element 12 may be shifted within the valve body 10 to open or close access to the various ports. Thus lands 34 and 38 control access to motor exhaust ports 16 and 17, respectively, by clearing or by closing off respective openings 25 and 26 in sleeves 19 and 20. Lands 35, 36 and 37 control access to motor ports 14 and 15 and valve exhaust port 18 by clearing or by closing the sleeve and bore openings to these ports as will be more fully explained in the following description of my valve.

Referring again to FIGURE 1, the spool 12 is in a central or neutral position. Fluid under pressure enters port 13 and passes into bores 11. Lands 35 and 37 in sleeves 27 and 28 block the passage of fluid to motor ports 14 and 15; the fluid pressure on faces 41 and 42 of sleeves 27 and 28 cause said sleeves to retract in bores 11 and compress springs 30 until the opposite faces of sleeves 27 and 28 contact the inner faces of sleeves 19 and 20 and are stopped thereby. This movement of check sleeves 27 and 28 is not sufficient to clear lands 35 and 37 and thus no fluid is allowed to pass into motor ports 14 and 15. All the fluid, therefore, passes through bores 11 between bore lands 39 and 40 and spool 12 into exhaust port 18 whereupon the fluid is transmitted to a reservoir for ultimate return through the source of fluid pressure to the fluid pressure port, thereby completing the circuit.

Figure 2:
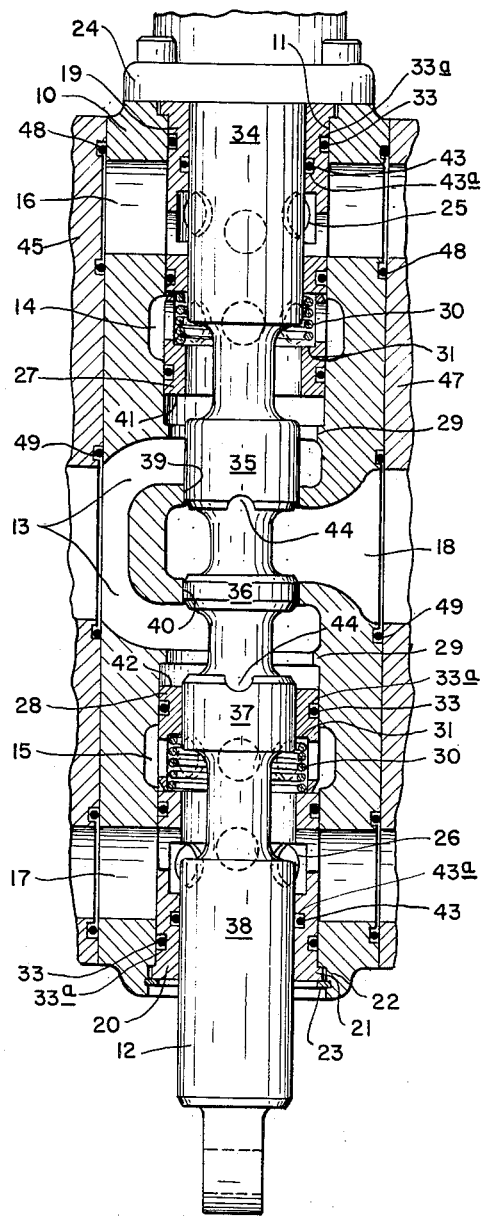
FIGURE 2 is a section through the single valve control of FIGURE 1, in one pressure position.

Referring to FIGURE 2, when spool 12 is moved to the left, land 35 engages bore land 39, land 36 engages bore land 40 and thus bores 11 are closed to exhaust port 18. Land 37 in sleeve 28 continues to close bores 11 to motor port 15, sleeve 28 not being able to move sufficiently to clear land 37. Land 35, however, has advanced sufficiently to permit the pressure motivated sleeve 27 to clear land 35 and thus allow the fluid pressure to pass therethrough into motor port 14. Since land 34 continues to close off opening 25 to exhaust port 16, the fluid must pass through motor port 14 to the pressure actuated device associated therewith. The fluid displaced by motivation of the pressure actuated device is returned to motor port 15 and since land 38 now clears opening 26 to motor exhaust port 17, the fluid is allowed to escape into motor exhaust port 17 and is thus exhausted to a reservoir for ultimate return to the source of fluid pressure.

In the event that a failure in fluid pressure delivery occurs and the fluid pressure is thereby lost or lowered, spring 30 will respond to move sleeve 27 back into engagement with land 35 and thereby substantially prevent any leakage from motor port 14 back through bores 11 into fluid pressure port 13. Thus the pressure actuated device will be stopped and held in such position as it had assumed at the time spring 30 responded. For example, if the pressure actuated device is a hoist with a load partially raised, the device will be locked upon the loss of pressure and the load will remain at its then position rather than dangerously dropping back to the ground or floor. Spring 30, of course, may be set to respond to any predetermined drop in pressure, as desired. O-type rings 43 are disposed in grooves 43a provided about the internal diameter of sleeves 19 and 20 for added insurance of a fluid-tight engagement between the engaging surfaces of the spool and said sleeves.

Spaced about the outer periphery of the inner faces of lands 35 and 37 are channels 44, which serve to cushion against shocks otherwise incurred in the valve when spool 12 is shifted to change the direction of fluid flow. When the spool 12 is shifted and the lands 35 or 37 proceed to engage the bore lands 39 and 40, the flow is not abruptly cut off since some fluid will continue to flow through the restricted channels 44 until said channels are completely covered by the bore lands 39 and 40 as the spool is further shifted. Thus the flow in another direction is already begun before the flow in the prior direction is completely stopped, thereby smoothing out what would otherwise be an impact on the valve.

Figure 3:
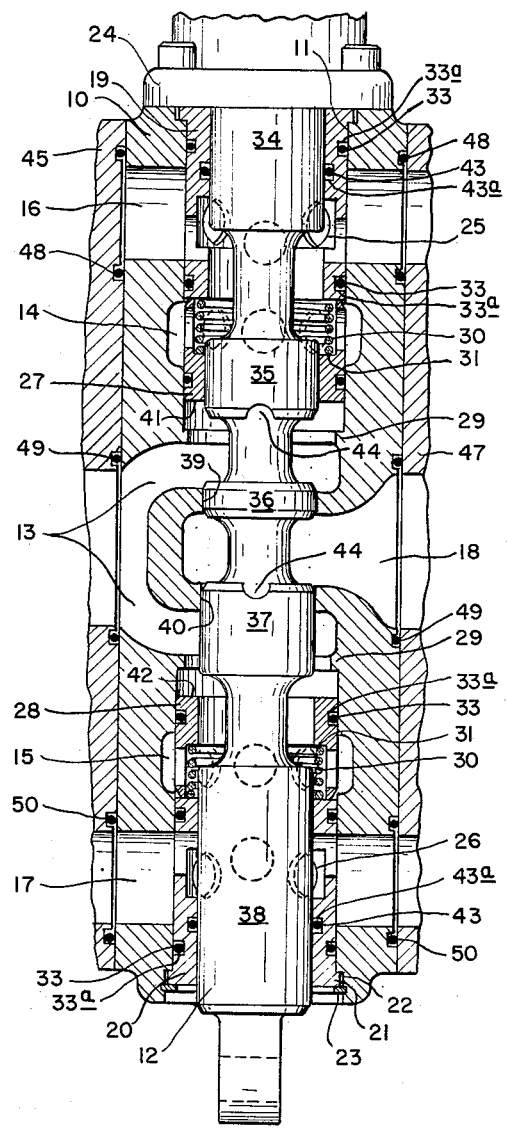
FIGURE 3 is a section through the single valve control of FIGURE 1, in release position.

Upon shifting spool 12 to the right, as viewed in FIGURE 3, the spool lands 36 and 37 engage the bore lands 39 and 40 to close off fluid passage to exhaust port 18. Spool land 35 in sleeve 27 closes passage to motor port 14, sleeve 27 being unable to move sufficiently to clear land 35. Land 37, however, has been shifted sufficiently to permit sleeve 28 to clear land 37 when moved by the fluid pressure on its face 42. Thus since land 38 now closes off openings 26 to motor exhaust port 17, the fluid must pass into motor port 15 to activate the pressure actuated device associated therewith. As explained heretofore, spring 30 may be set to react at any desired predetermined pressure drop to move sleeve 28 as a check valve back into engagement with spool land 37 in the event of a pressure line break or other cause for pressure drop, whereby communication of motor port 15 is closed off to freeze the pressure actuated device in its then present position. Spool land 34 has moved sufficiently to clear openings 25 in sleeve 19 to permit the flow of exhaust fluid from the pressure actuated device through motor port 14 into motor exhaust port 16 for ultimate return through a reservoir to the source of fluid pressure. The spool 12, of course, may be returned to the neutral position at any time during the activation of the pressure actuated device to stop and hold said device it in its then position since the motor ports and the motor exhaust ports are closed off as previously explained. Any suitable relief valve, familiar to those skilled in the art, may be provided to relieve excessive pressure on the system or to relieve any continued pressure in the event that spool 12 is allowed to remain in a shifted position after the pressure actuated device has been activated to its limit of movement.

To further explain my invention, let us assume that spool 12 has been ground and honed to maintain the close clearance of .0002 inch with bores 11 to prevent leakage of fluid, but that it somehow became slightly warped in operation. In the prior art devices, it can be readily understood that even the slightest deviation from the true axis of said spool would prevent the spool from entering the bore lands or if forced to enter would bind and stick in said bore. In my control valve, however, this deviation is compensated for by the generous clearance allowed between the bore and the sleeves. For example, if spool lands 34 and 35 deviate slightly to the left, sleeves 19 and 27 in this particular embodiment may shift to the left up to .005 inch to compensate for it without any sacrifice of fluid tightness or ease of valve operation. Likewise, deviations that occur in the bore rather than the spool will be compensated for. If, for example, bores 11 are slightly out of line either due to fabrication, warpage or slight distortion of the body casting under pressure, the various sleeves may shift in this particular embodiment up to .005 inch in any direction from the bore to compensate for it and thus preserve true bore alignment for the spool to slide in. My control valve thereby not only minimizes the difficulties arising out of axial deviations of either the bore or the spool or combined deviations of both together but also eliminates the necessity of grinding the bore to the near perfect alignment and close clearance required in other control valves.

In the preferred embodiment shown in the drawings, I have not provided sleeves for the center portion of bores 11 at bore lands 39 and 40. In the presently described embodiment, it has been found that the deviations in the bore or spool have not necessitated providing sleeves for said bore lands, since the sleeves otherwise provided have proven sufficient to compensate for deviations that have occurred and further since this arrangement facilitates the use of sleeves 27 and 28 additionally as check valves in the operation of my control valve. Also, there is no serious problem in achieving the close tolerance and clearance requirements in this much shorter bore section as compared to the long bore sections required in other control valves. However, it is to be distinctly understood that in another present preferred embodiment my valve is constructed with sleeves disposed in the bore so that no part of the spool lands need engage the bore or bore lands.

In still another preferred embodiment, I provide a multiple control valve made up of a plurality of my control valves. In the multiple control valve shown in FIGURE 4, said valve is made up of three of my control valves. Since the structures of the individual control valves are similarly corresponding to each other, the numbers used for identification of the various elements and members are the same for each control valve with the addition of ' or " to indicate the additional individual control valves.

Figure 4:
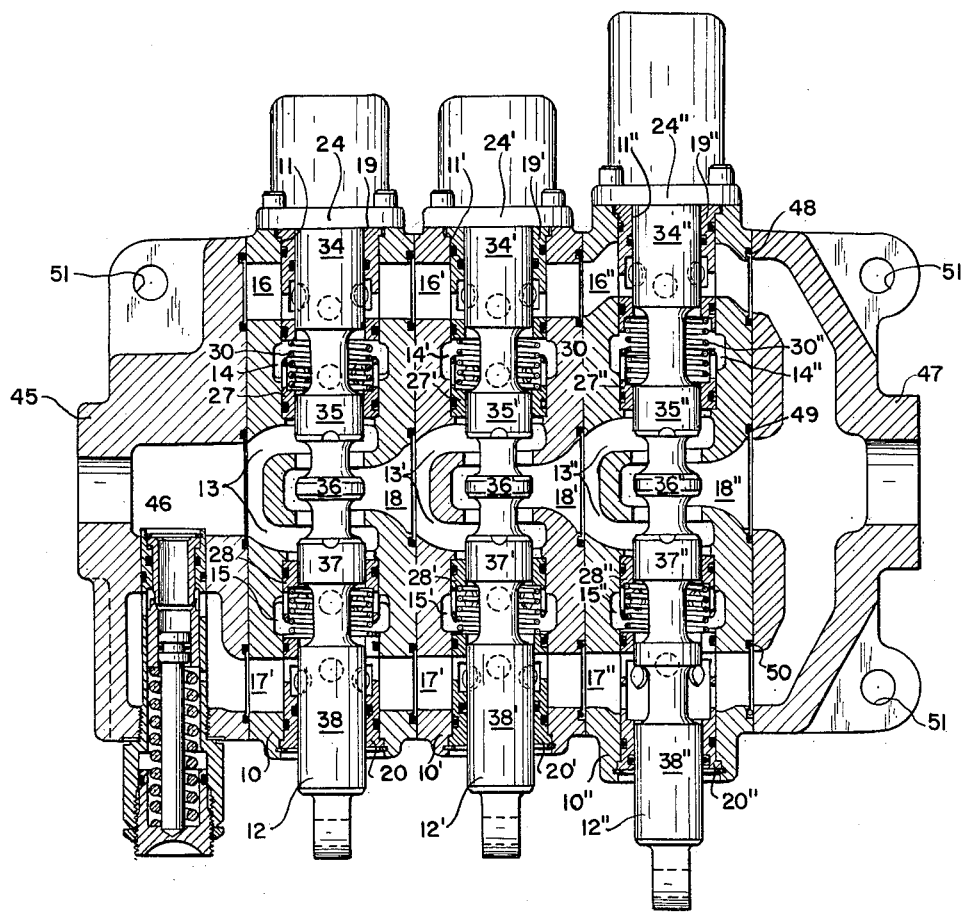
FIGURE 4 is a section through a multiple control valve according to my invention.

Referring now to FIGURE 4, I provide three control valves of the structures and operation aforedescribed in this application. Valve bodies 10, 10' and 10" are so constructed that they may be bolted or otherwise held together whereby motor exhaust ports 16 and 17 register with motor exhaust ports 16' and 17' which in turn register with motor exhaust ports 16" and 17", respectively, valve exhaust port 18 registers with pressure port 13', and valve exhaust port 18' registers with pressure port 13". I further provide pressure delivery cap 45 attached to valve body 10 through which fluid pressure is delivered to pressure port 13. Cap 45 contains a relief valve 46 through which the fluid pressure may pass directly from cap 45 to motor exhaust port 17.

Relief valve 46 may be set to operate at any predetermined desirable pressure level whereby the control valve and associated pressure actuated devices are protected against undesirable pressures.

Cap 45 further seals off the portion of motor exhaust port 16 that opens on the pressure port side of valve body 10 whereby exhaust fluid passing into motor exhaust port 16 may only flow out that portion of port 16 operatively connected with motor exhaust port 16'.

I further provide exhaust collector cap 47 attached to valve body 10" whereby the openings in collector cap 47 register with the exhaust ports 16", and 17" and 18" to collect exhaust fluid from said ports for transmission to a reservoir for ultimate return to the source of fluid pressure.

Sealing rings 48, 49 and 50 assure fluid-tight connections between delivery cap 45, valve bodies 10, 10' and 10", and collector cap 47. Caps 45 and 47 contain openings 51 whereby the valve assembly may be attached to a suitable support member.

The operation of the individual control valves comprising my multiple control valve is the same as that earlier described in the specification. However, since the source of fluid pressure to valve bodies 10' and 10" is valve exhaust ports 18 and 18' respectively, it is necessary that spool 12 be in neutral position to deliver fluid pressure to valve body 10' and that both spools 12 and 12' be in neutral position to deliver fluid pressure to valve body 10". Therefore, it is generally desirable that the means for shifting the spools 12, 12' and 12" be biased to return said spools to their neutral position when said means is released.

While I have shown and described certain present preferred embodiments of the invention, it is to be distinctly understood that the invention is not limited thereto but may be otherwise variously embodied within the scope of the following claims.

I claim:

1. A control valve for use with fluid pressure actuated devices and the like comprising a valve body having a cylindrical bore, port means in said valve body adapted to connect said bore selectively with a source of fluid pressure, with exhaust means and with pressure actuated devices, check valve sleeve means in slidable engagement with said bore and disposed within said bore between the port means to said pressure actuated devices and the port means to said source of fluid pressure, a valve spool element slidably disposed within said bore and check valve sleeve means adapted to cooperate with said check valve sleeve means to control communication between said port means to the source of fluid pressure, the pressure actuated devices and the exhaust means, said check valve sleeve means being movably responsive to fluid pressure, and biasing means operable to bias said check valve sleeve means against said movement responsive to fluid pressure whereby said check valve sleeve means moves against said biasing means in response to a predetermined amount of fluid pressure and is returned by said biasing means in response to a predetermined drop in fluid pressure.

2. A control valve for use with fluid pressure actuated devices and the like comprising a valve body having a cylindrical bore, port means in said valve body adapted to connect said bore selectively with a source of fluid pressure, with exhaust means and with pressure actuated devices, check valve sleeve means in slidable engagement with said bore and disposed within said bore between the port means to said pressure actuated devices and the port means to said source of fluid pressure, a valve spool element slidably disposed within said bore and check valve sleeve means adapted to cooperate with said check valve sleeve means to control communication between the port means to the source of fluid pressure, the pressure actuated devices and the exhaust means, said check valve sleeve means being movably responsive to fluid pressure, and spring means operable to resiliently urge said check valve sleeve means against said movement responsive to fluid pressure whereby said check valve sleeve means moves against said spring means in response to a predetermined amount of fluid pressure and is returned by said spring means in response to a predetermined drop in fluid pressure.

3. A control valve for use with fluid pressure actuated devices and the like comprising a valve body having a cylindrical bore, port means in said valve body adapted to connect said bore selectively with a source of fluid pressure, with exhaust means and with pressure actuated devices, check valve sleeve means in slidable engagement with said bore and disposed within said bore between the port means to said pressure actuated devices and the port means to said source of fluid pressure, a valve spool element having lands slidably disposed within said bore and said check valve sleeve means adapted to cooperate with said check valve sleeve means to control communication between said port means, said check valve sleeve means being responsive to fluid pressure whereby to movably respond to the fluid pressure sufficiently to clear the lands of the spool element and thus permit the fluid pressure to flow through said clearance, means operable to limit the movement of said check valve sleeve means, and biasing means operable to resiliently urge said check valve sleeve means toward a position of engagement with the lands of said spool element whereby said check valve sleeve means respond to a predetermined drop in fluid pressure to return said check valve sleeve means into engagement with the lands of said spool element thereby closing said clearance and substantially stopping the flow of fluid therethrough.

4. A control valve for use with fluid pressure actuated devices and the like comprising a valve body having a cylindrical bore, port means in said valve body adapted to connect said bore selectively with a source of fluid pressure, with exhaust means and with pressure actuated devices, sleeve members within said bore, a valve spool element slidably disposed within said sleeve members and adapted to control communication between said source of fluid pressure, said pressure actuated devices and said exhaust means, said sleeve members having a substantially greater external clearance with said bore than inside clearance with said spool element, wherein at least one of said sleeve members is in slidable engagement with said bore and disposed between the port means to the source of fluid pressure and the port means to the pressure actuated devices, said last mentioned sleeve member being movably responsive to the fluid pressure, and biasing means operable to resiliently urge said last mentioned sleeve member against said fluid pressure whereby said last mentioned sleeve member being moved against the biasing means in response to a predetermined amount of fluid pressure is returned by said biasing means in response to a predetermined loss of fluid pressure.

5. A control valve for use with pressure actuated devices and the like comprising a valve body having a cylindrical bore, port means in said valve body adapted to connect said bore selectively with a source of fluid pressure, with exhaust means and with pressure actuated devices, sleeve members within said bore, a valve spool element having lands slidably disposed within said sleeve members and adapted to control communication between said source of fluid pressure, said pressure actuated devices and said exhaust means, the clearance between the bore and the sleeve members being on the order of .010 inch and the clearance between the sleeve members and the spool element being on the order of .0002 inch, said sleeve members disposed between the port means to the source of fluid pressure and the port means to the pressure actuated devices being in slidable engagement with said bore and movably responsive to fluid pressure whereby said last mentioned sleeve members movably respond to a predetermined fluid pressure sufficiently to clear said lands of the spool element and thus allow the fluid pressure to flow therethrough, spring means operable to resiliently urge said last mentioned sleeve members toward a position of engagement with said lands of the spool element whereby said last mentioned sleeve members return to engagement with said lands of the spool element in response to a predetermined drop in fluid pressure thereby substantially stopping the flow of fluid therethrough, and means operable to limit the extent of movement of said last mentioned sleeve members.

6. A multiple control valve for use with fluid pressure actuated devices and the like comprising a housing, a plurality of individual generally side-by-side bores in said housing, inlet means in the housing, port means in said housing adapted to connect each said bore selectively with a source of fluid pressure, with exhaust means and with pressure actuated devices, check valve sleeve means in slidable engagement with each of said bores and disposed within each of said bores between the port means to said pressure actuated devices and the port means to said source of fluid pressure, a valve spool element slidably disposed within said check valve sleeve means adapted to cooperate with said check valve sleeve means to control communication between the port means to the source of fluid pressure, the pressure actuated devices and the exhaust means, said check valve sleeve means being movably responsive to fluid pressure, and spring means operable to resiliently urge said check valve sleeve means against said movement responsive to fluid pressure whereby said check valve sleeve means moves against said spring means in response to a predetermined amount of fluid pressure and is returned by said spring means in response to a predetermined drop in fluid pressure, wherein the respective ports of the individual bores are in registry and operably connected to provide said individual bores with a common source of fluid pressure and a common means of exhaust.

7. A multiple control valve for use with fluid pressure actuated devices and the like comprising a housing, a plurality of individual generally side-by-side bores in said housing, inlet means in the housing, port means in said housing adapted to connect each of said bores selectively with a source of fluid pressure, with exhaust means and with pressure actuated devices, sleeve members within each of said bores, a valve spool element having lands slidably disposed within said sleeve members and adapted to control communication between said source of fluid pressure, said pressure actuated devices and said exhaust means, the clearance between the bore and the sleeve members being on the order of .010 inch and the clearance between the sleeve members and the spool element being on the order of .0002 inch, said sleeve members disposed between the port means to the source of fluid pressure and the port means to the pressure actuated devices being in slidable engagement with said bore and movably responsive to fluid pressure whereby said last mentioned sleeve members movably respond to a predetermined fluid pressure sufficiently to clear said lands of the spool element and thus allow the fluid pressure to flow therethrough, spring means operable to resiliently urge said last mentioned sleeve members toward a position of engagement with said lands of the spool element whereby said last mentioned sleeve members return to engagement with said lands of the spool element in response to a predetermined drop in fluid pressure thereby substantially stopping the flow of fluid therethrough, and means operable to limit the extent of movement of said last mentioned sleeve members, wherein the respective ports of the individual bores are in registry and operably connected to provide said individual bores with a common source of fluid pressure and a common means of exhaust.

References Cited in the file of this patent

UNITED STATES PATENTS

| | | |
|---|---|---|
| 2,286,020 | Smyth | June 9, 1942 |
| 2,448,532 | Kirkham | Sept. 7, 1948 |
| 2,448,557 | Stephens | Sept. 7, 1948 |
| 2,501,328 | Gurries | Mar. 21, 1950 |
| 2,634,751 | Borer | Apr. 14, 1953 |
| 2,651,324 | Hodgson et al. | Sept. 8, 1953 |
| 2,699,756 | Miller | Jan. 18, 1955 |
| 2,767,689 | Moog | Oct. 23, 1956 |
| 2,823,647 | Meyer | Feb. 18, 1958 |
| 2,852,039 | Dotter | Sept. 16, 1958 |
| 2,912,007 | Johnson | Nov. 10, 1959 |